UNITED STATES PATENT OFFICE.

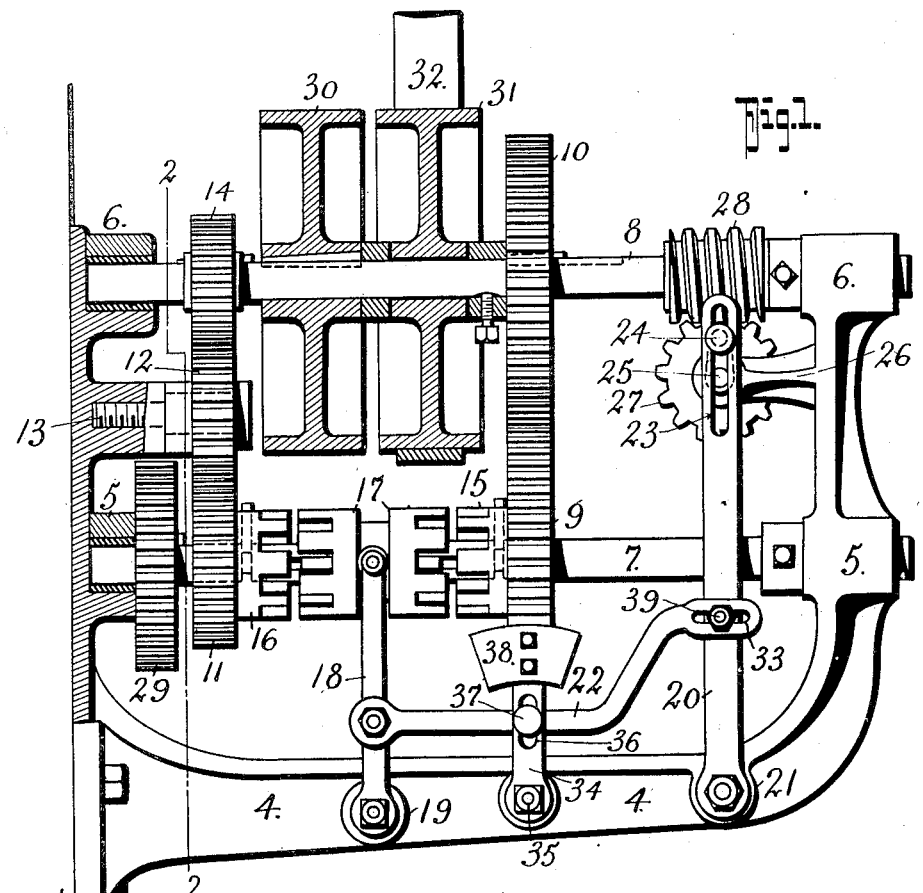
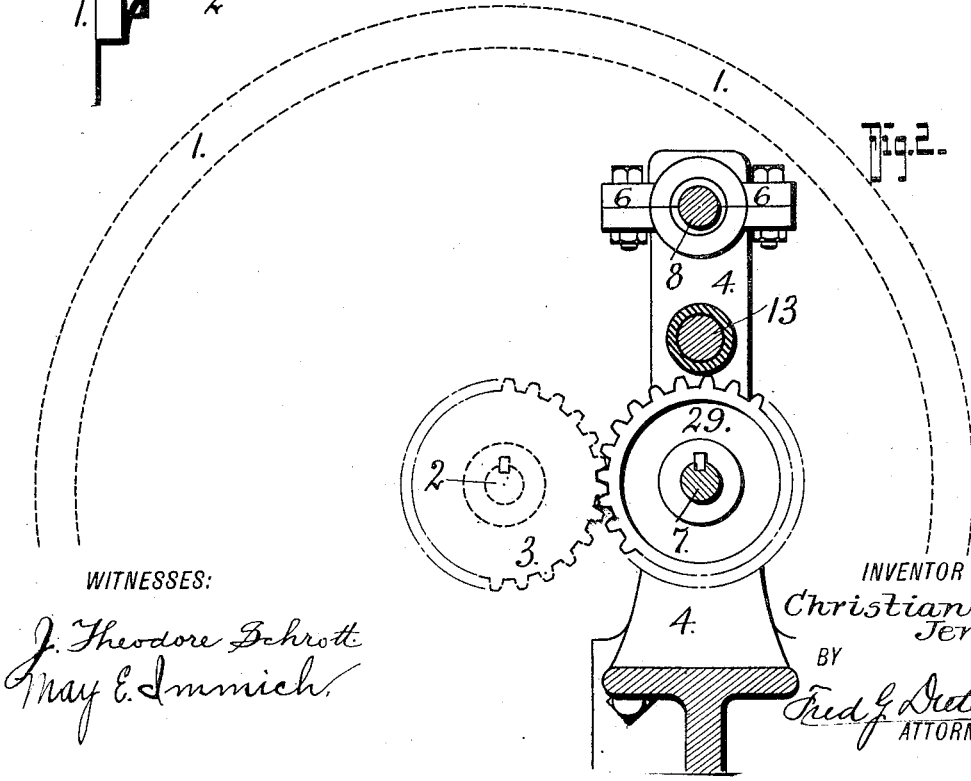

CHRISTIAN JENSEN, OF PALMYRA, NEW JERSEY.

POWER-TRANSMISSION MECHANISM.

934,535. Specification of Letters Patent. Patented Sept. 21, 1909.

Application filed April 2, 1909. Serial No. 487,473.

*To all whom it may concern:*

Be it known that I, CHRISTIAN JENSEN, residing at Palmyra, in the county of Burlington and State of New Jersey, have invented certain new and useful Improvements in Power-Transmission Mechanisms, of which the following is a specification.

My invention is an improved driving mechanism more particularly adapted for use in connection with rotary cylinder washing machines of that type wherein the cylinder is rotated first in one direction and then in another direction. In washing machines of this type it is desirable in order to obtain the best result that the number of revolutions of the cylinder in one direction be, as near as practicable, equal to the number of revolutions of the cylinder in the opposite direction. It is to accomplish this result that I have developed my present form of power transmission mechanism.

My present invention embodies a pulley or driving shaft geared up with a driven shaft in such manner that by shifting a clutch on the driven shaft the direction of rotation of such shaft may be reversed; means are also provided for automatically shifting such clutch at intervals to effect such reversing of the driven shaft. The driven shaft is operatively connected to the cylinder shaft to operate it in unison with the driven shaft.

More specifically my present invention embodies those novel details of construction, combination and arrangement of parts all of which will be first described and then be specifically pointed out in the appended claims, reference being had to the accompanying drawings, in which:

Figure 1, is a side elevation and part section of my invention. Fig. 2, is a section on the line 2—2 of Fig. 1, the cylinder casing, its shaft and shaft gear being shown in dotted lines.

Referring now to the accompanying drawings in which like numerals of reference indicate like parts in all of the figures, 1 designates a washing machine casing, 2, the cylinder shaft and 3 a gear thereon, all of which parts may be of the usual construction, as they, *per se*, form no part of my present invention.

In practice I provide a bracket 4 which is secured to one head of the casing 1 and has bearings 5—5 and 6—6 for the driven shaft 7 and the driving or pulley shaft 8, respectively.

The shafts 7 and 8 are geared together by gears 9 and 10 respectively, the gear 10 being fast on the shaft 8, while the gear 9 is loose on the shaft 7. This connection between the two shafts I shall hereinafter call the "forward or direct" gear connection, since a gear on one shaft meshes directly with a gear on the other shaft. The shafts 7 and 8 are also geared together by gears 11, 12 and 14, the gear 11 being loose on the shaft 7 and meshing with the gear or pinion 12 that turns loosely on the stub shaft 13, while the gear 14 is fast on the shaft 8, and meshes with the gear 12. This connection between the shafts I shall hereinafter call a "reverse or indirect" gear connection since a gear on one shaft is connected with a gear on the other shaft through the medium of a third, or intermediate gear.

The gears 9 and 11 have clutch members 15 and 16 respectively to coöperate with the shifting clutch member 17 that turns with the shaft 7 and is slidable into engagement with one or the other of the clutch members 15 and 16 by a lever 18, pivoted at 19 to the bracket 4 and moved by a second lever 20 pivoted at 21 to the bracket 4 and connected to the lever 18 by a rod 22, as shown.

The lever 20 has a slot 23 to receive the crank 24 of the shaft 25 journaled in a bearing in the end of an arm 26 of the bracket 4. The crank shaft 25 carries a worm gear 27 that meshes with a worm 28 on the shaft 8.

The shaft 7 may be operatively connected in any desired manner with the cylinder shaft 2, but for purposes of illustration I have shown the connection made by a gear 29 on the shaft 7 and a gear 3 on the shaft 2.

Fast and loose pulleys 30 and 31, respectively, are carried by the shaft 8 to receive the driving belt 32 that turns the shaft 8. A lever 34 pivoted at 35 and weighted at 38 has a slot 36 through which it is connected at 37 to rod 22. Rod 22 has a slot 33 through which pin 39 passes.

Operation: When the belt 32 is on the pulley 30 (it may be shifted from one pulley to another to stop and start the mechanism in any well known manner) the shaft 8 is set into rotation thereby turning the crank shaft 25 through the worm 28 and gear 27 to rock the lever 20, and consequently the lever 18 to shift the clutch 17 into engagement with first one clutch member 15, and then the other clutch member 16. When the clutch member 17 is in engagement with the clutch member 15 the "forward or direct" gear connection is in operation and when the clutch member 17 is in connection with the member 16, the "reverse or indirect" gear connection is in operation. Thus the shaft 7 is rotated first in one direction and then in the other and consequently the motion of the shaft 7 is imparted to the cylinder shaft in first one direction and then in the other without changing the direction of rotation of the driving shaft 8. By properly proportioning the parts a greater or less sweep of the levers 18 and 20 may be obtained and the time it takes the clutch member 17 to engage either clutch member 15 or 16 after leaving the other, may thus be varied so that the time elapsing between reversals of the shaft 7, and consequently the cylinder shaft 2, may be lengthened or shortened, as desired.

From the foregoing description taken in connection with the accompanying drawings it is thought the complete construction, operation and advantages of my invention will be readily understood by those skilled in the art to which the invention appertains.

What I claim is:

1. A driving shaft, a driven shaft, forward and reverse gear connections between said shafts, a device on the driven shaft for bringing either of said gear connections into operation, means operated by the driving shaft for partly actuating said device, and gravity operating means for completing the actuation of said device.

2. A driving shaft, a driven shaft, a plurality of sets of gear connections between said shafts, a shifting clutch member on the driven shaft for bringing either of said gear connections into operation, a gravity actuated means for shifting said clutch members, and means on the driving shaft for moving said gravity actuated means past its dead center to operate said clutch shifting means.

3. A driving shaft, a driven shaft, a plurality of sets of gear connections between said shafts, a shifting clutch member on the driven shaft for bringing either of said gear connections into operation, a lever for shifting said clutch, a crank shaft, gear connections between the crank shaft and the driving shaft, and means connecting the crank shaft with the clutch shifting lever for actuating the same.

4. A driving shaft, a driven shaft, a plurality of sets of gear connections between said shafts, a shifting clutch member on the driven shaft for bringing either of said gear connections into operation, a lever for shifting said clutch, a crank shaft, gear connections between the crank shaft and the driving shaft, means connecting the crank shaft with the clutch shifting lever for actuating the same, said last named means comprising a pivoted lever connected with the crank shaft and a link rod connecting said last named pivoted lever with the clutch shifting lever.

CHRISTIAN JENSEN.

Witnesses:
WM. E. HIRES,
GEO. W. SHADE.